US008782627B2

(12) United States Patent
Steensgaard et al.

(10) Patent No.: US 8,782,627 B2
(45) Date of Patent: Jul. 15, 2014

(54) PATH SPECIALIZATIONS FOR RUNTIME CODE WITH PHASE BEHAVIOR

(75) Inventors: Bjarne Steensgaard, Bothell, WA (US); Erez Petrank, Redmond, WA (US); Filip Pizlo, Indianapolis, IN (US)

(73) Assignee: Microsoft Corporation, Redmond, WA (US)

(*) Notice: Subject to any disclaimer, the term of this patent is extended or adjusted under 35 U.S.C. 154(b) by 1543 days.

(21) Appl. No.: 11/947,031

(22) Filed: Nov. 29, 2007

(65) Prior Publication Data

US 2009/0144712 A1   Jun. 4, 2009

(51) Int. Cl.
*G06F 9/45*   (2006.01)

(52) U.S. Cl.
USPC .............................. 717/154; 717/141; 717/151

(58) Field of Classification Search
CPC combination set(s) only.
See application file for complete search history.

(56) References Cited

U.S. PATENT DOCUMENTS

| | | | | |
|---|---|---|---|---|
| 5,774,728 A * | 6/1998 | Breslau et al. | ................ | 717/141 |
| 5,930,807 A | 7/1999 | Ebrahim et al. | | |
| 6,292,939 B1 * | 9/2001 | Itou et al. | ...................... | 717/151 |
| 6,671,707 B1 | 12/2003 | Hudson et al. | | |
| 7,089,272 B1 | 8/2006 | Garthwaite et al. | | |
| 7,210,122 B2 | 4/2007 | Shuf et al. | | |
| 7,225,439 B2 | 5/2007 | Garthwaite | | |
| 7,543,282 B2 * | 6/2009 | Chou | ............................ | 717/151 |
| 7,590,806 B2 * | 9/2009 | Harris et al. | .................. | 711/154 |
| 7,979,852 B2 * | 7/2011 | Bodin et al. | ................... | 717/154 |
| 8,069,440 B2 * | 11/2011 | Tirumalai et al. | ............. | 717/151 |
| 8,117,605 B2 * | 2/2012 | Lev et al. | ....................... | 717/154 |
| 8,271,964 B2 * | 9/2012 | Zorn et al. | ..................... | 717/140 |
| 8,468,507 B2 * | 6/2013 | Agarwal et al. | ............... | 717/140 |
| 8,495,603 B2 * | 7/2013 | Archer et al. | ................. | 717/149 |
| 2005/0149587 A1 | 7/2005 | Bacon et al. | | |
| 2005/0149589 A1 | 7/2005 | Bacon et al. | | |
| 2006/0271921 A1 * | 11/2006 | Cronce et al. | ................ | 717/151 |
| 2007/0011415 A1 * | 1/2007 | Kaakani et al. | ............... | 711/159 |
| 2007/0022149 A1 | 1/2007 | Bacon et al. | | |
| 2007/0118579 A1 | 5/2007 | Hudson et al. | | |
| 2007/0226722 A1 * | 9/2007 | Chou | ............................ | 717/158 |
| 2007/0234316 A1 * | 10/2007 | Bayerlein | ..................... | 717/140 |
| 2008/0034360 A1 * | 2/2008 | Bodin et al. | ................... | 717/154 |
| 2008/0127134 A1 * | 5/2008 | Tirumalai et al. | ............. | 717/151 |
| 2008/0244239 A1 * | 10/2008 | DeWitt et al. | ................. | 712/220 |
| 2012/0174083 A1 * | 7/2012 | Shpeisman et al. | ........... | 717/154 |
| 2013/0185704 A1 * | 7/2013 | Kuesel et al. | ................. | 717/151 |

OTHER PUBLICATIONS

A.M. Cheadle et al.; A Method Specialisation and Virtualised Execution Environment for Java; ACM; 2008; retrieved online on Feb. 21, 2014; pp. 51-60; Retrieved from the Internet <URL: http://delivery.acm.org/10.1145/1350000/1346264/p51-cheadle.pdf?>.*

(Continued)

*Primary Examiner* — Thuy Dao
*Assistant Examiner* — Hanh T Bui
(74) *Attorney, Agent, or Firm* — Dan Choi; Brian Haslam; Micky Minhas

(57) ABSTRACT

Mechanism that employs code cloning and specialized code execution for barriers to minimize runtime overhead. This is facilitated by duplicating code and inserting specializations of the barriers in the code copies. The mechanism is effective for garbage collection when the garbage collection executes through different phases, and the barrier behavior and overheads depend on these phases. The duplicated and specialized code enables the program to run efficiently by reducing the dynamic count of a phase check when the phase is well-known and phase checks can be avoided.

20 Claims, 9 Drawing Sheets

(56) References Cited

OTHER PUBLICATIONS

Toshio Suganuma et al.; Design and Evaluation of Dynamic Optimizations for a Java Just-In-Time Compiler; IBM Tokyo Research Laboratory; ACM 2005; retrieved online on Feb. 21, 2014; pp. 732-785; Retrieved from the Internet <URL: http://delivery.acm.org/10.1145/1080000/1075386/p732-suganuma.pdf?>.*

Mauricio Breternitz, Jr. et al.; Compilation, Architectural Support, and Evaluation of SIMD Graphics Pipeline Programs on a General-Purpose CPU; IEEE, 2003; retrieved online on Feb. 21, 2014; pp. 1-11; Retrieved from the Internet <URL: http://ieeexplore.ieee.org/stamp/stamp.jsp?tp=&arnumber=1238010>.*

Cheadle, et al., "Exploring the Barrier to Entry Incremental Generational Garbage Collection for Haskell", 2004, ACM, pp. 12.

Chilimbi, et al., "Using Generational Garbage Collection to Implement Cache-Conscious Data Placement", 1998, ISMM, pp. 12.

Barabash, et al., "A Parallel, Incremental, Mostly Concurrent Garbage Collector for Servers", ACM Transactions on Programming Languages, vol. 27, No. 6, 2005, pp. 1-49.

Clinger, et al., "Generational Garbage Collection and the Radioactive Decay Model", retrieved at <<http://64.233.183.104/search?q=cache:6dG4bh5P7rQJ:ftp://ftp.ccs.neu.edu/pub/people/will/...>>, pp. 11, Jun. 1997.

\* cited by examiner

PATH SPECIALIZATIONS FOR RUNTIME CODE WITH PHASE BEHAVIOR

BACKGROUND

As programs continue to increase in size and data handling, more effective means for managing memory and reducing overhead become a necessity. Garbage collection is one mechanism for reclaiming memory used by objects of an application that will not be used again by that application.

Many garbage collectors and other runtime systems require that special code is executed during modification or access of memory locations that may contain pointer values. Moreover, some garbage collectors introduce an overhead on any memory access (not only for memory locations containing pointer values). The use of such code is called a barrier. Barrier code in garbage collectors often incurs significant runtime overhead.

Garbage collectors, and in particular, concurrent and real-time garbage collectors, often use write- and read-barriers whose code depends on garbage collection phases. A write-barrier is a piece of code that is executed with each memory write operation. Write-barriers may be used for any modifications of memory state, but many garbage collectors use write-barriers only for modification of locations containing pointer values. A read-barrier is a piece of code that is executed with each memory read operation. Read-barriers are especially notorious for reducing program efficiency and are employed only when the benefits are important, such as with real-time garbage collection. For many collectors, and especially concurrent collectors, the barrier overhead is not uniform throughout program execution.

The program execution typically causes the garbage collector to cycle through a set of garbage collection phases, and each phase requires a different set of actions to be taken (e.g., a different behavior of the barrier). Oftentimes there is a substantial idle phase in which the collector is not active and the barrier needs to take no action. When the barrier execution depends on garbage collection phases, the barrier execution typically begins by determining the current phase in order to decide what should be done. This check is generally fast, but the frequency of performing the checks may cause the net effect to be relatively costly, especially if the barrier otherwise is very efficient, or even needs to do nothing else for long periods of times. The phase check is a frequent execution of code that may be unnecessary, can detrimentally impact the in-lining abilities of the compiler, pollute the instruction cache, and consume resources from the branch prediction mechanism.

Conventionally, the garbage collector designer will manually need to address code inefficiencies directly to reduce the cost of memory barriers—by avoiding the use of barriers for common operations (e.g., memory reads), by attempting to remove unnecessary memory barriers from the program via compiler analysis, and/or by aggressively hand-tuning the barrier code.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed technique is a compiler optimization referred to as path specialization that reduces the cost of operations that are dependent upon the state (phase) of the execution environment (e.g., the memory barrier operations inserted into programs that are executed in an environment that includes garbage collectors). The technique is employed to modify the compiler's code-generation component to decrease write-barrier overheads and reduce read-barrier overheads.

In the context of garbage collectors (e.g., concurrent, incremental and realtime) collectors, the path specialization technique decreases write-barrier overheads and reduces read-barrier overheads. The technique is effective when used with collectors that go through phases employing different barrier behaviors. The effectiveness can increase for collectors that have an idle phase in which no barrier activity is required. Note that although this description may include embodiments where there is a different phase for each barrier, this is not to be construed as limiting, since in other implementations there can be more phases than there are different barrier behaviors.

Path specialization aims at reducing barrier overheads by reducing the amount of work required for phase checks. This reduces the amount of computation required, allows better register allocation, reduces the load on branch prediction resources, and improves code cache behavior. Path specialization starts with code specialization, which includes creating multiple copies of the program code, and then modifying each copy to handle one or more phases of the collector. Since each specialized code version is restricted to being executed in only a subset of the possible phases, the checks performed in order to determine the current phase and what to do in this phase can be reduced. In particular, if a specialized code version is only executed in the garbage collector idle phase, for which no barrier action is required, the barrier code can be entirely eliminated in this specialized code version. Path specialization also generates code for the appropriate control transfer between specialized code versions according to changes in the computing environment (e.g., garbage collector phase changes). The generation of appropriate control transfer code may be done in a way that avoids the use of specialized static analysis. The modifications to the compiler and runtime by the disclosed path specialization technique are minor.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
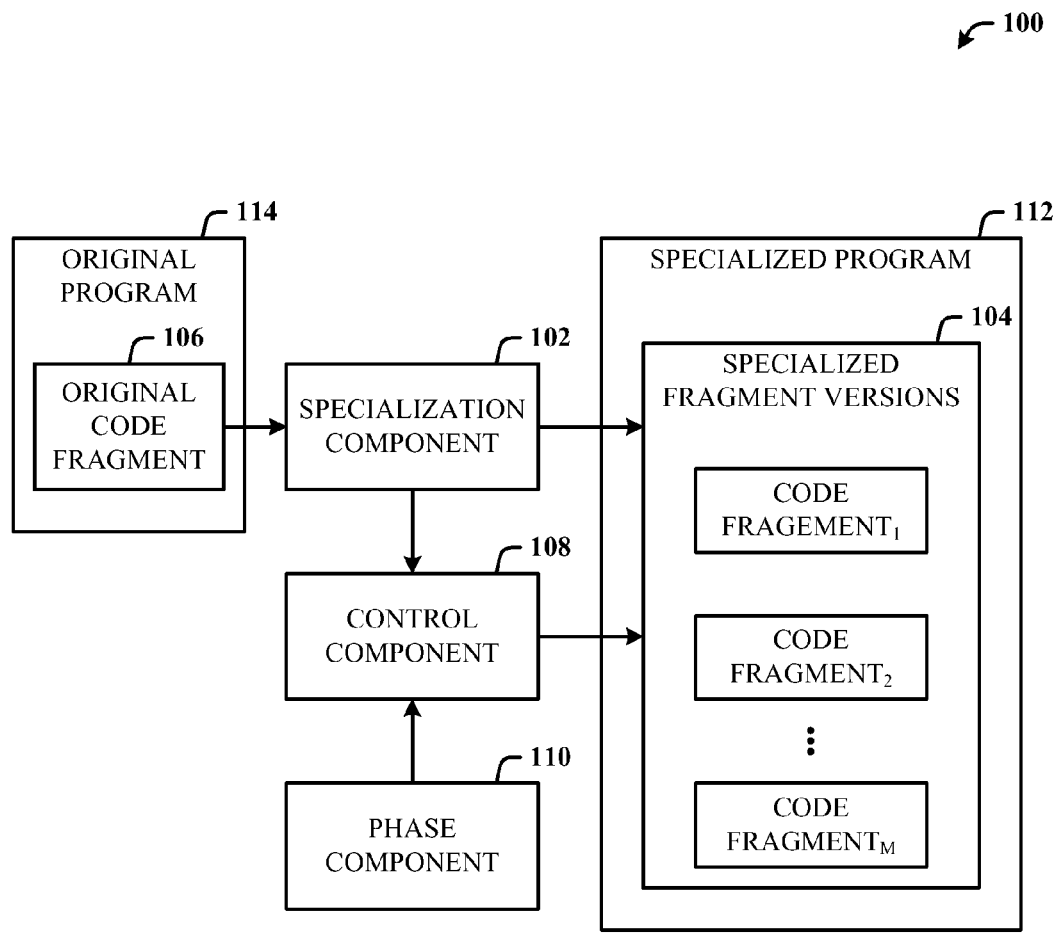
FIG. 1 illustrates a computer-implemented optimization system.

Many garbage collectors, such as concurrent, incremental, and realtime collectors, require that special code is executed during modification or loads of memory locations that may contain pointer values. Some collectors incur an overhead on any memory access (not only for memory locations containing pointers). Such code is called a memory barrier. A write-barrier is a piece of code that is executed with each memory write (modification) and a read-barrier is a piece of code that is executed during each memory read (load).

Memory barriers are used for different reasons. Tracing garbage collectors (which are a popular choice in modern systems) trace the set of reachable objects, by recursively traversing pointers in reachable objects. However, concurrent and incremental collectors do not necessarily obtain an atomic snapshot of the heap view. In particular, the program can modify pointers and change the shape of the object graph while the collector is tracing. Unless compensated for, such pointer changes may foil the trace of the heap yielding wrong conclusions about the set of reachable objects.

A write-barrier is typically used by concurrent and incremental collectors to allow cooperation between the program, which changes the pointers in the heap, and the collector, which traces the live objects. This cooperation between the program and the collector is typically only needed during the collector's tracing phase. Each mutator thread must cooperate with the collector according to which phase it believes the garbage collector is in. This is typically done by executing code that queries the collector's state and then executing the appropriate code depending on the result of this query. If the test and the appropriate code is not executed in a transaction or otherwise being excluded from being executed when the collector's state changes, the collector must allow the mutator threads some latitude in when thread behavior must begin to change subsequent to the change in collector state. Path specialization attempts to take advantage of this latitude by letting the choice of what barrier code to execute depend on queries of collector state performed for prior barriers, to the extent permissible by the garbage collector.

Realtime collectors typically employ a compacting mechanism in order to avoid memory fragmentation. To preserve realtime properties, the compaction is run incrementally or concurrently. Oftentimes, such concurrent copying requires a read-barrier to be introduced. The cumulative cost of a read-barrier is typically higher than that of a write-barrier.

Traditionally, garbage collector designers reduce the cost of memory barriers directly—by aggressively hand-tuning the barrier code, by attempting to remove unnecessary memory barriers from the program via compiler analysis, or by attempting to avoid expensive barriers in their algorithm. The disclosed path specialization technique is a new approach to barrier optimization that permits the garbage collector designer the liberty to utilize more expensive memory barriers, avoiding most of the hand-tuning or compiler analysis effort.

Consider a collector that goes through phases, and for which the behavior of a memory barrier depends on the phase the garbage collector is in. The simplest implementation, and one that is used by a significant number of conventional collectors, is to start the memory barrier by checking for the current phase and then performing the relevant barrier code for that phase. These checks require a repeated computational effort that uses branch prediction resources, and pollutes the code cache. The disclosed path specialization method substantially reduces the need for phase checks.

The disclosed path specialization technique creates specialized versions of the code, which use barriers that are valid for only a partial set of the possible phases. The specialized versions of the code may be created by first cloning (or duplicating) an original version of the code and then specializing the different versions for different execution contexts. Typically, the set of possible phases can be partitioned into disjoint subsets and specialized versions of the code are created for each of these subsets. One possible simple partition causes the creation of one code version for handling the idle phase and another version for handling all other phases.

Having the program execute one code version during the idle phase and a second code version during non-idle phases yields a number of advantages. This eliminates the need to perform phase checks for each barrier in the idle version, essentially eliminating all barriers from the idle version. This also eliminates or reduces the phase checking part of the barrier in the non-idle phase. Even when not counting the phase checking part, the specialized barrier code is typically smaller than the general barrier code. This may, in turn, lead to better automatic in-lining of barrier code as well as better register allocation and instruction selection by the compiler. Smaller, in-lined, specialized barrier code can also provide improvements in the use of hardware, including the instruction cache and branch prediction buffers.

Given the general idea of executing code specialized for different execution contexts (e.g., garbage collector phases), a mechanism is employed to guide the flow of control from one code fragment to the other. The technique herein also allows more flexibility in the triggering and coverage of program tracing and sampling.

Garbage collection phase changes are typically only required to be recognized by the mutator threads (application threads that mutate an object reference graph) at specific program code locations, denoted herein as safe points. In particular, phase changes are not required to be recognized in barriers between the query of the collector's state and the execution of the appropriate barrier operations. Some garbage collector implementations are able to interrupt a mutator thread at any point, but may have to use some mechanism (e.g., simulation of the machine code, or inserting break points into the machine code) to ensure that the mutator exits any regions of code critical for the garbage collector. For such garbage collector implementations, the safe points in the code may be very frequent. Other garbage collector implementations rely on the mutator to perform calls of the garbage collector to acknowledge requests for handshakes. For such garbage collector implementations, the safe points in the code are less frequent and are easily identified as calls to a specific set of methods.

Path specialization is useful when memory barriers occur more frequently than safe points. This is because phase checks can be moved out of the barriers and towards safe point locations. Once a phase check has been executed, a mutator thread is allowed to assume that the garbage collector remains in the same phase until the mutator thread reaches a subsequent safe point.

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented optimization system 100. The system 100 includes a specialization component 102 for creating multiple versions of specialized code fragments 104 from an original code fragment 106. Each specialized code fragment 106 is suitable for execution in a specified subset of execution environment phases. A control component 108 of the system 100 is employed for transferring control at runtime between the specialized code fragments 104 according to observed execution environment phase changes. A phase component 110 observes the phase changes and signals the control component 108 to transfer control between the codes fragments in accordance with the observed phase change. The control component 108 and phase component 110 operate at runtime, while the specialization component 102 operates on the original code fragment 106 at compile time.

Path specialization operates to not only create the specialized code fragments 104 at compile time but also facilitates passing control to the different specialized code fragments 104 at runtime for optimized program execution. It is also possible to have duplicate specialized programs for execution according to specific purposes.

In one implementation, the original code fragment 106 is executed using a runtime system that includes a garbage collector. In the presence of a garbage collector, read-barriers and write-barriers may be employed for performing certain operations on memory. These read and write-barriers are implemented in computer code. The cost of executing this computer code may vary depending on the phase of the garbage collector. The barriers induced by the garbage collector can invoke a substantial amount of work for the program just reading or writing values. Where the garbage collector is in either a fully active or semi-active state then the read-barrier or write-barrier may have a substantial cost associated with it since there can be a lot of code being executed. In an idle phase the costs for checking in which phase the collector is just wasted effort in the sense that it does not include any actions necessary for the collaboration between the program and the garbage collector.

By cloning the original code fragment of an original program 114 into specialized code, various versions of the read- and write-barriers can be inserted into the specialized code. For example, if the garbage collector is in the idle phase, read and write-barriers specialized for the idle phase can be used in place of the general read- and write-barriers, where the specialized read- and write-barriers may incur no extra cost over simply reading or writing the appropriate memory location(s). Then jumps can be inserted to move control of execution between the various specialized versions of the specialized code and/or the original code. Tests can be performed that determine the phases in response to which jumps to the appropriate specialized code are made.

In one implementation, the Stopless garbage collector may be used. The Stopless garbage collector operates in five phases: an idle phase, a preparation phase, a pin phase, a copy phase and a forward phase. A single specialized version of the code may be used for all the slow phases (the non-idle phases). Thus, there would be two specialized versions of the (original) program code. However, it is to be understood that the work can be generalized to generate as many specialized copies of the code as is determined to be optimal or desirable. Selection of which version of the code to execute can be performed dynamically by means of conditional jumps as the code executes. The decision of how many versions and how many specialized forms to create is done statically and can be done manually.

The disclosed mechanism includes modifying the compiler to insert into the generated code the checks and appropriate jumps between the various specializations of the original code. Thus, the choice as to what codes are executed at any given point is made at runtime when the code is running. The checks are inserted by the compiler according to the design into which specializations will be employed.

The garbage collector of the runtime system is the code that automatically reclaims memory that is no longer used by the program. The garbage collection code does not have to be modified for use with the disclosed mechanism. The compiler can be modified to generate multiple copies of the original program code and then insert the appropriate specialized read- and write-barriers into the copies to make the different specialized versions. The compiler can also be modified to insert conditional jumps between the various versions of the program code to ensure that the specialized read- and write-barriers are only executed when the executing thread is in a phase for which the specialized barriers are appropriate.

Each specialized path may contain only parts of the required code, building on the assumption that each specialized path is run only during its corresponding phases of the program. Possibly, one copy of the code is able to be executed in any phase and will contain phase checks and conditional jumps to the appropriate program versions specialized for various subsets of phases. The program versions specialized to be run in only a subset of the possible phases may transfer control to the version that can be run in any program phase when it is no longer desirable or semantically correct to assume that the execution context is in one of the program phases specialized for.

It is within contemplation of the disclosed mechanism that generating the specialized versions need not be the end of the optimization process. For example, there are optimizations that can be employed on the specialized versions to further improve execution (or reduce overhead). Another example includes optimizations related to where the conditional branches should occur in the code. Another example of optimization is to one that avoids duplicating parts of the code that are infrequently executed.

A common separation that may be kept in mind for the rest of the description is the use of one specialized barrier which handles the collector's idle phase and an unspecialized barrier that handles all phases, the unspecialized barrier causing a branch into the code specialized for the idle phase when possible. The description is separated into intra-procedural path specialization and inter-procedural path specialization.

A similar separation, which is also common, is to have one version specialized for the idle phase, another version specialized for the non-idle phases, and a third version that is valid for all phases. The third version can serve either only as the place-holder for the conditional branches to the appropriate places in the first two versions, or it could also be used to contain general barrier code for code paths that are infrequently executed (this reduces the degree of code size growth) or for code that contains sufficiently few barrier operations that it is not considered worth the overhead to have specialized versions of the code.

Figure 2:
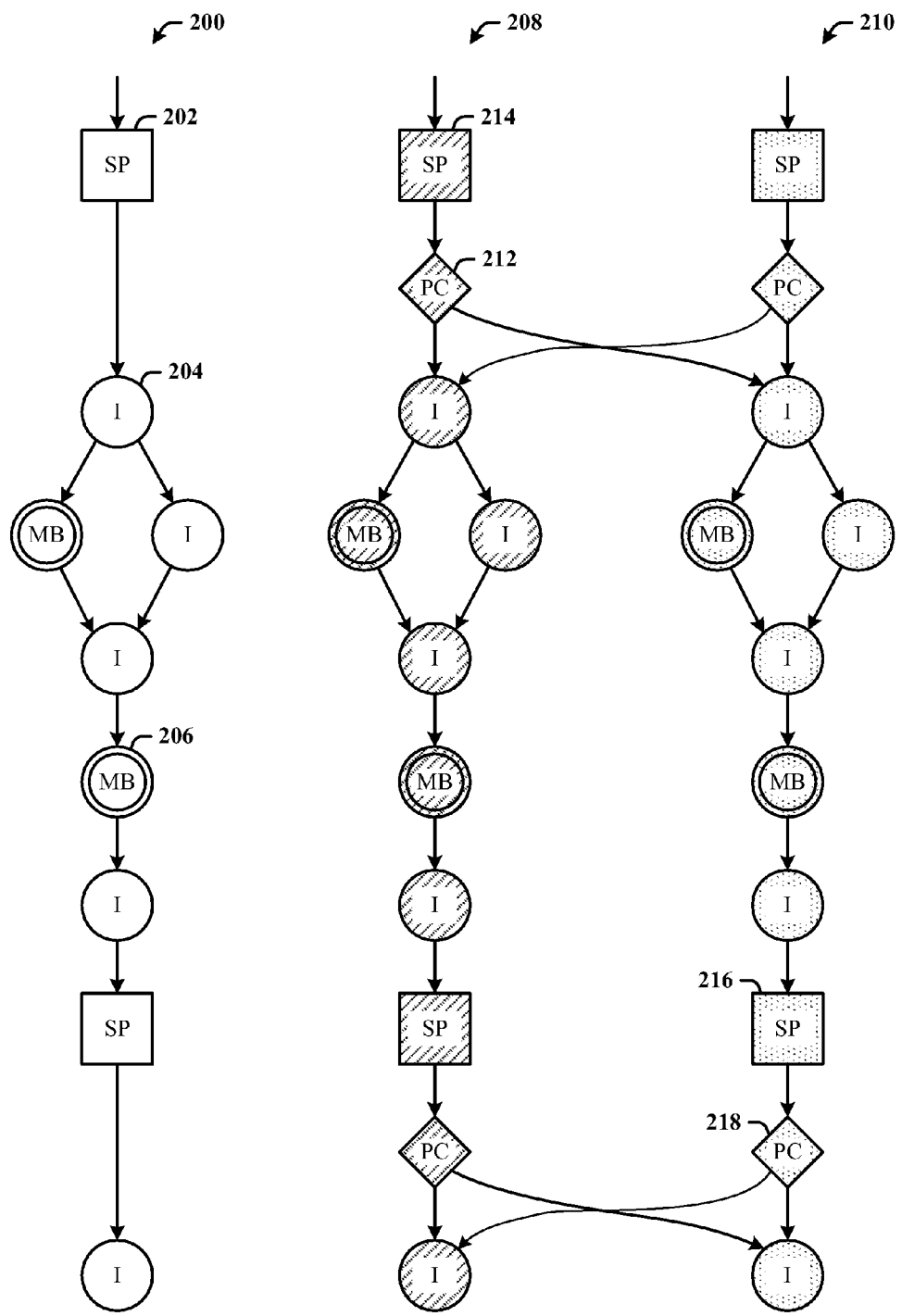
FIG. 2 illustrates a naïve approach to path specialization in accordance with the disclosed architecture.

FIG. 2 illustrates a naïve approach to path specialization in accordance with the disclosed architecture. Path 200 represents an uncloned (also referred to as uninstrumented or unduplicated or original code) program fragment without specialization, as in a standard program. As shown here, the uncloned path 200 that will serve as the basis for path specialization can include one or more of the following: a safe point 202 (denoted SP, and symbolized as a square), instructions 204 without a memory barrier (also denoted I and symbolized as a circle), and instructions with a memory barrier 206 (also denoted MB and symbolized as a double circle).

Two specialized paths or versions of the code (also referred to as instrumented or cloned code) are created: a first specialized path 208 and a second specialized path 210. Each specialized path (208 and 210) is used for different subsets of the possible phases (e.g., idle and non-idle). It is to be understood that the number of phases can be more than the two specialized paths (208 and 210) shown (e.g., five, ten, etc.); however, the description is limited to two phases for discussion purposes only.

In order to perform the control transfer between the two specialized code fragments (208 and 210), a phase check operation (denoted PC and symbolized as a diamond) can be added after each safe point SP in both specialized code versions (208 and 210). Following the phase check PC, a conditional branch can transfer the flow to the appropriate point in the appropriate specialized code. Execution continues in the chosen specialized version until the assumption of unchanged phase is no longer valid or desirable. For example, execution may continue in a chosen specialized version until the next safe point SP or until the next method call.

Control flow can move between the specialized paths (208 and 210). For example, in the first path 208, a first phase check 212 is inserted after a first safe point 214, which can either jump flow to the second path 210, or maintain flow in the same path 208. When jumping to the second path 210, flow eventually reaches a second safe point 216 where a second phase check 218 is made. Flow can continue in the second path 210 or jump back to the first path 208 based on the second phase check 218. The operation is similar from the perspective of the second path 210 jumping to the first path 208 and then back, for example.

This simple yet novel scheme in FIG. 2 can cause a significant increase in code size. Each program point in the original code path 200 will have a corresponding program point in each specialized code version (208 and 210). The code can be expected to essentially double in size. The problem is that there is a lot of code that is duplicated without being specialized and some of this duplication can be avoided. In particular, all code that appears after a safe point SP and before the next memory barrier MB is exactly the same in both specialized code versions (208 and 210). The same holds for all code prior to a safe point SP and after the last preceding barrier operations MB.

Figure 3:
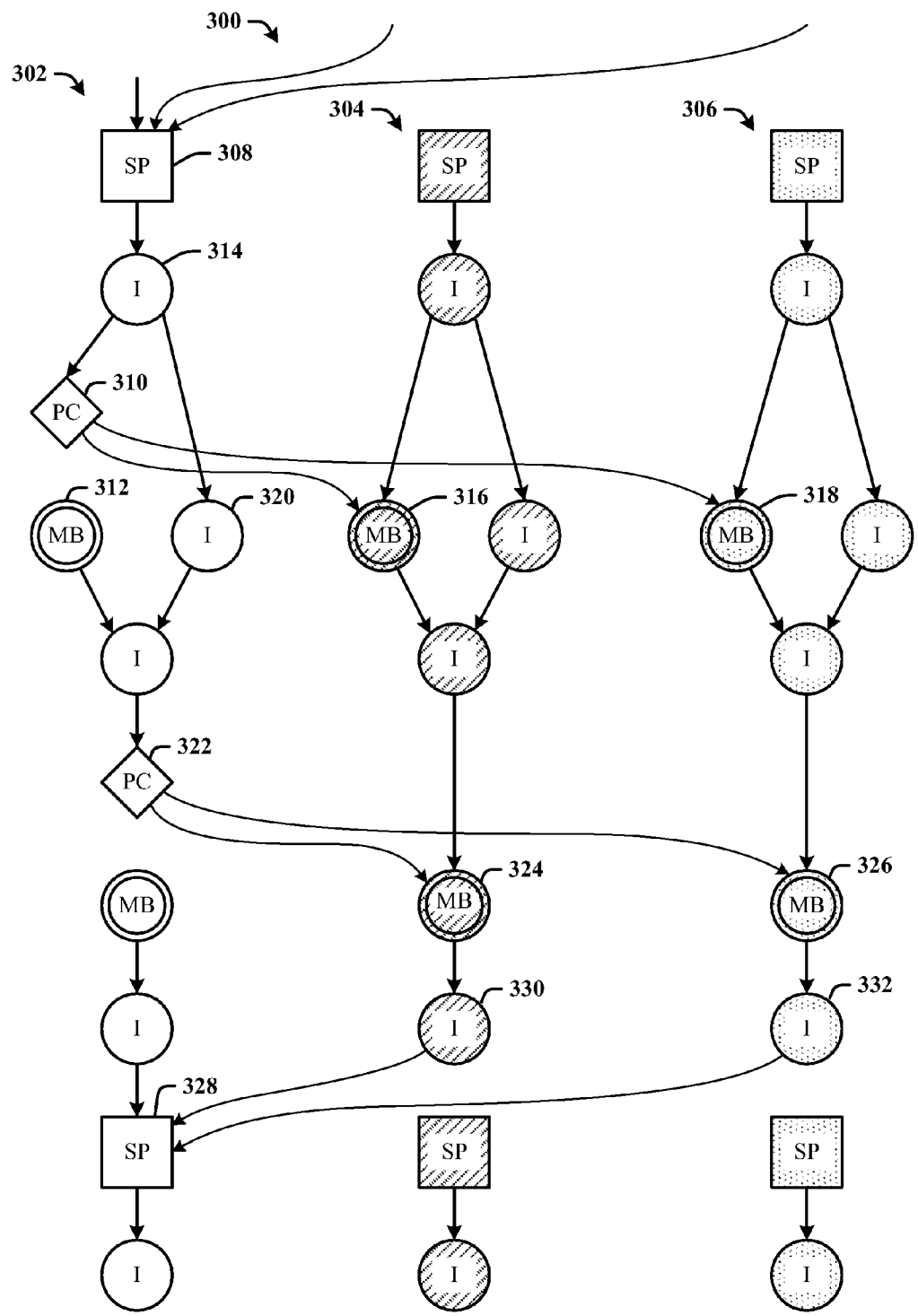
FIG. 3 illustrates an exemplary technique for eliminating redundant code in specialization paths.

FIG. 3 illustrates an exemplary technique for eliminating redundant code in specialization paths. A solution for eliminating this redundant duplication is to unconditionally transfer control (as represented at 300) from code versions into one specialized "main" code fragment 302, and from there, into specialized code paths. For example, the original code fragment 200 of FIG. 2 can be specialized by inserting phase checks PC at select points such as before memory barriers MB, becoming the specialized main code fragment 302. For example, the main code fragment 302 receives flow from a first specialized path 304 and a second specialized path 306 into a safe point 308. A phase check 310 is inserted before a memory barrier 312 of the main fragment 302 such that when execution reaches the instructions 310 control can be passed conditionally to a memory barrier 316 of the first specialized path 304, and also to a memory barrier 318 of the second specialized path 306.

If control stays in the main fragment 302 and reaches another inserted phase check 322, control is conditionally transferred to a memory barrier 324 of the second path 304 or a memory barrier 326 of the second path 306. Control eventually transfers unconditionally back to a safe point 328 of the main fragment 302 after instructions 330 of the first path 304 and instructions 332 of the second path 306.

Avoiding redundant execution of phase checks may appear straightforward; however, the execution paths between safe points and subsequent memory barriers are not necessarily simple. It is possible that a branch appears after a safe point and several code paths fork out before a memory barrier appears in any of the paths. Finding the "first" memory barriers after a given safe-point, and not adding redundant tests to memory barriers that are not "first" in the main version, can be achieved by using a static analysis that resembles a dominance analysis.

Following is a description of one method for optimization discussed above that does not employ any specialized static analysis. The method adds an additional main code version and uses dead code elimination to perform the trimming of non-relevant conditional branches.

Assume as given a requirement for a memory barrier (a read-barrier, a write-barrier, or both) which varies according to m different program phases. The program phase may dynamically change at well-defined safe points in the program code. A first step is the partitioning of the set of m phases into any n subsets, $S_1, \ldots, S_n$, where $2 \leq n \leq m$, and design a specialized barrier for each of the subsets. On one extreme, each phase is represented by a distinct specialized version and n=m. On the other extreme, which is the simplest and a very effective design choice, the subsets are n=2 with one barrier version handling the idle phase (or the one with the smallest overhead) and the other barrier version handling all the other phases.

In one method, start by creating n+1 versions of the code. The first version (version 0) handles all common code and branches into the specialized versions of the code. This version of the code employs the original memory barrier. There are n more versions of the code. The i-th version of the code contains a specialized barrier code that is specifically designed to handle only the phases that belong to the i-th subset of phases, $S_i$, plus additional code to transfer control back to version 0, when desired. A test function, referred to as a predicate, (supplied by the user of the path specialization technique) examines the current phase and decides the number i of the code version that is be executed.

The code for control transfer is automatically inserted into the code copies by the compiler, as explained below. The predicate and each of the specialized barriers to be used in the i-th specialized version of the code (for each $1 \leq i \leq n$) is written by the user of the path specialization technique (e.g., the designer of the garbage-collector).

An intra-procedural path specialization is described herein along with additional inter-procedural optimizations. Since a path specialization method can be considered at an intra-procedural level, it is assumed code is given for one method and then the code needs to be specialized. The predicate P, which gets a phase number and returns i, its corresponding code version, and a specialized barrier for each of the n specialized paths, are also given.

The compiler starts by creating n copies of the code in addition to the original version of the code. In each of the n copies, the corresponding specialized barrier replaces the general barrier. In the original code, just before any memory barrier, code is inserted that computes the predicate P and according to the resulting i jumps to the i-th code version. Note that this is performed for all memory barriers and not only for the first barrier after a safe point. Thus, no analysis is required. Initially, this may seem wasteful, because branching occurs only at the first barrier following a safe point, but this waste will be eliminated later. In the specialized code, the barriers are not modified with any branches, but are replaced by the specialized barriers given by the developer. The compiler then goes over the safe points in all specialized paths and installs an unconditional branch into the main code version (number 0) just before each safe point so that safe points will only run on the main code version.

The steps described above are the only steps required to make the code work with path specialization. However, these steps can cause the creation of a significant amount of unreachable code. But eliminating dead code is an optimization that exists in most compilers and can be used to remove the non-relevant parts. Thus, without any additional analysis, optimized code is obtained for the path specialization method.

In order to specify this algorithm more rigorously, a safepoint is defined as a point in which a phase may change. For garbage collection this usually means that the program thread is willing to cooperate with the garbage collector via some handshake mechanism, or by having all the relevant information ready for a collector inspection. The cooperation usually happens in one of two different approaches. In one approach, the program thread actively checks "once in a while" (at a safe point) to determine if the program is to cooperate with the collector. The safe point in this case is runtime cooperation code that is executed between two program instructions. Another approach is to let the collector signal the program threads and halt the threads during execution. The threads may only be stopped at safe points, where in this case, safe points are points inbetween two program instructions that contain no specific code. What makes these safe points is the fact that these points are considered point at which is it safe to stop the threads.

In other contexts herein, a safe point can be a point between two program instructions, where cooperation may occur. In the path specialization method, special attention is paid to method calls. When a method is called, a phase change can happen while the method code is executing, and so after returning, the code version that is to be used may change. Thus, at a point after a method returns, a phase change is handled, if one has occurred. In one embodiment, control is transferred to the general/main code version just before calling the method. This means a return to the general code version after returning from the method, and at or after that point, checking the phase and jumping to the appropriate code version prior to executing any barrier code.

This conservative approach can be relaxed and a check made for a phase change in a routine when allowing inter-procedural path specialization. In one implementation, it is assumed that all methods have a single entry point and that method calls will return to a specific code point (unless the method terminates due to a thrown exception). Similar consideration can be given to returning from native code, or when waking up from waiting on some event, since the phase might have changed since the last phase check. These cases can be handled in the same manner as method calls are handled and thus, are not explicitly described further. The code generation discussed above is specified in FIG. 7.

Figure 4:
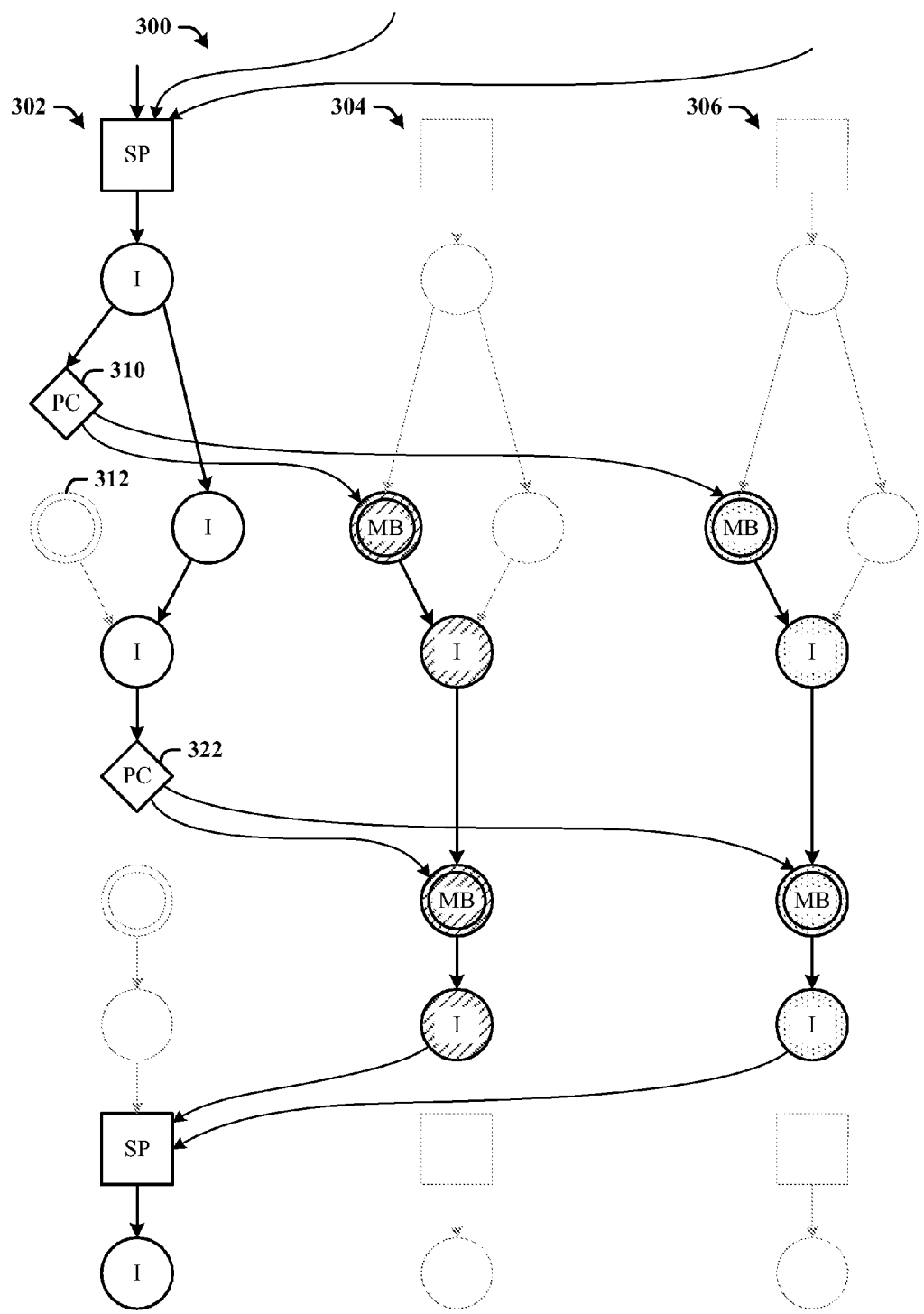
FIG. 4 illustrates dead code elimination in the exemplary paths of FIG. 3.

FIG. 4 illustrates dead code elimination in the example paths of FIG. 3. Generally, nodes that are not reachable are eliminated, as indicated by lighter shading. The compiler then erases these nodes as dead code.

An alternative algorithm for path specialization can perform tail merging for code paths, in effect only creating the specialized code if doing so allows the use of specialized barriers relative to the original code.

Another alternative algorithm can compute both the benefit and the cost of having and executing the specialized code, and use the information to decide whether or not to specialize a code fragment.

Further improvements to path specialization are possible when inter-procedural information is introduced. In the description above, method calls were considered safe points. In particular, it followed that upon return from a method, control returned to the original code, or a subsequent check was made to determine which specialized path should be taken prior to executing any operation for which a specialized version exists. This is due to the conservative assumption that one of the (transitively) called methods may contain a real safe point where the phase in the original code can change. This change can in turn dictate a change in the selection of the specialized path.

A code reachability analysis can be used to determine if code reachable during the method call actually contains a real safe point. If a real safe point is not reachable during the call, the execution can proceed in the specialized path upon return from the method execution, correctly assuming that the collector phase has not changed.

If a reachability analysis indicates that a safe point is not reachable during a call, the called methods themselves may be specialized according to which phase the collector is in, rather than just having a single method body per method that contains various specialized versions of the code. The specialized versions of the code containing the call sites can then have the method calls modified to instead call the appropriate specialized methods.

If the compilation environment supports methods with multiple entry points, a method can be specialized to have an original entry point plus up to N specialized entry points. Method calls in specialized code fragments can then be modified to call the appropriate entry point in the specialized method. Similarly, if the compilation environment supports multiple possible return addresses, then a method can be specialized to return to different code points depending upon the phase the collector is assumed be in at the end of the function.

Figure 5:
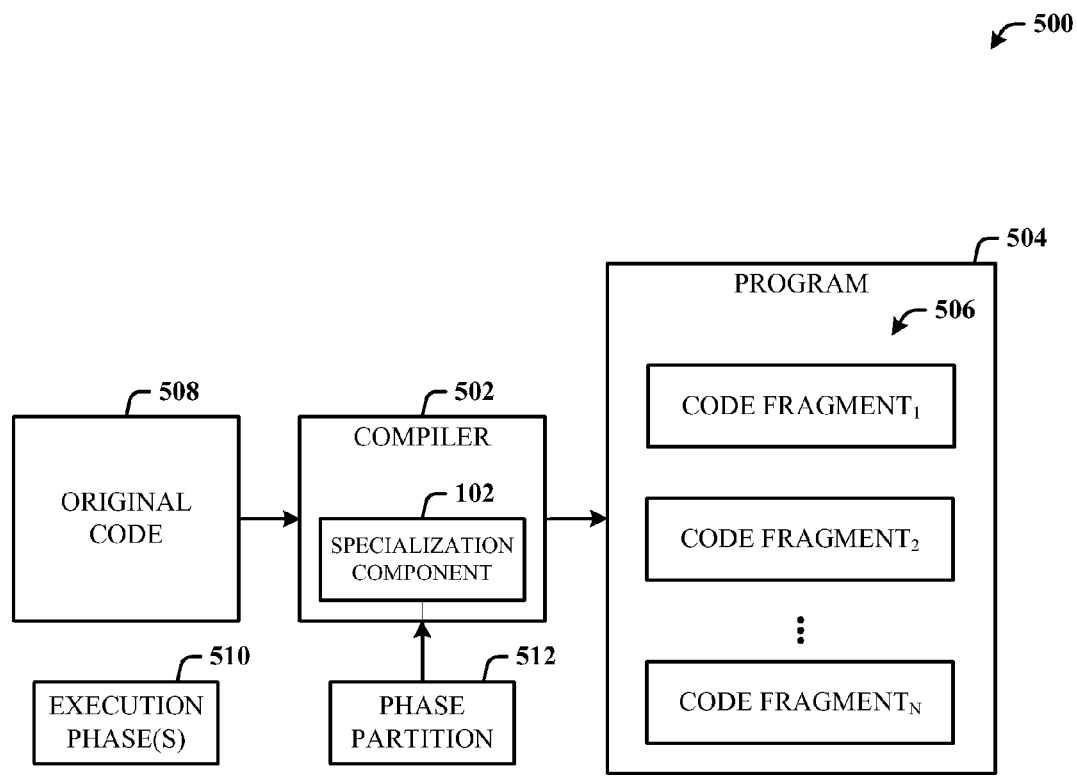
FIG. 5 illustrates a system that employs a compiler to clone specialized collector versions.

FIG. 5 illustrates a system 500 that employs a compiler 502 to generate a program 504, where the program 504 includes a number of specialized versions of code fragments 506 specialized for different execution contexts. In this particular example, the specialization component 102, which is part of the compiler 502, inserts read-barriers and/or write-barriers into the specialized code fragments 506 during compiling and outputs code that spawns the program 504 as an executable version for selection based upon one or more execution phases 510 in which the original code 508 operates. The specialization component 102 receives phase partition information 512 operating in the different specialized paths.

Each thread of execution is logically running in one of the collector phases at all times. The collector may instigate a phase change, which will eventually cause each of the program threads to observe the change of phase. The program threads are only required to observe such a phase change at garbage collection safe points.

The path specialization optimization can be implemented in a compiler as a general optimization stage independent of the actual barrier (or other operations) used. The optimization stage takes as arguments the specification of two barriers, each of which is used to insert barrier code for two disjoint subsets of garbage collector phases. The typical usage pattern is to provide one specification of the barrier to use for the idle phase of the garbage collector and another specification to use for all other phases.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
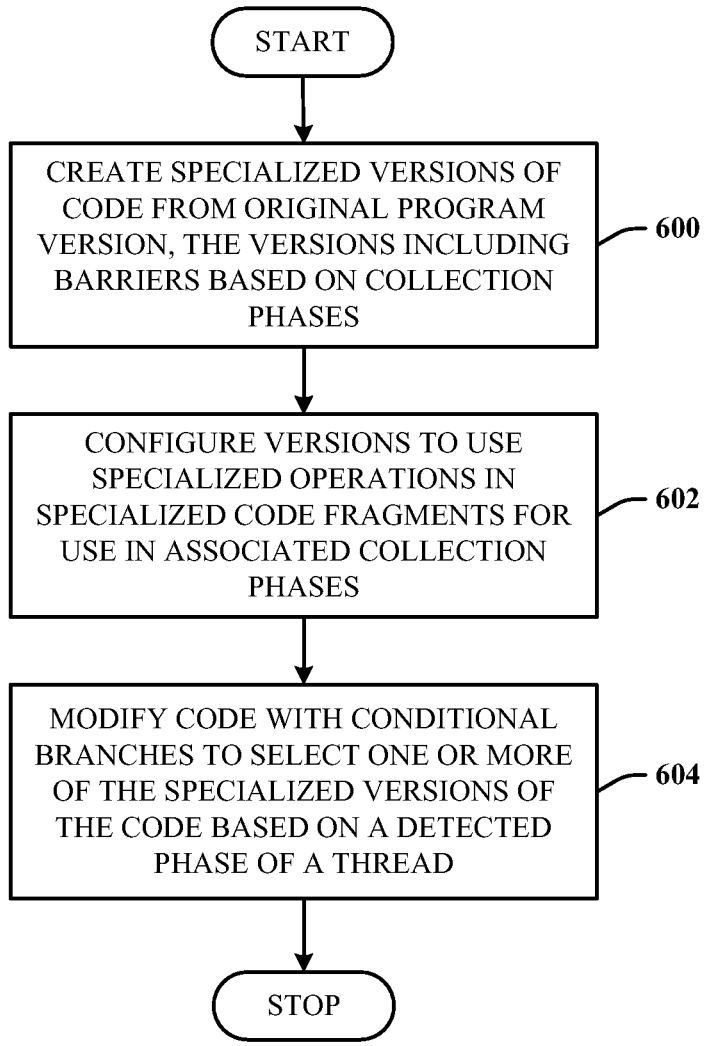
FIG. 6 illustrates a computer-implemented method of optimizing a runtime application.

FIG. 6 illustrates a computer-implemented method of optimizing a runtime application. At 600, code is duplicated into multiple code copies based on corresponding collection phases. At 602, the copies are configured to use specialized barriers for use in associated collection phases. At 604, the code is modified with conditional branches to select and execute the specialized code barriers based on a detected phase of a thread.

Figure 7:
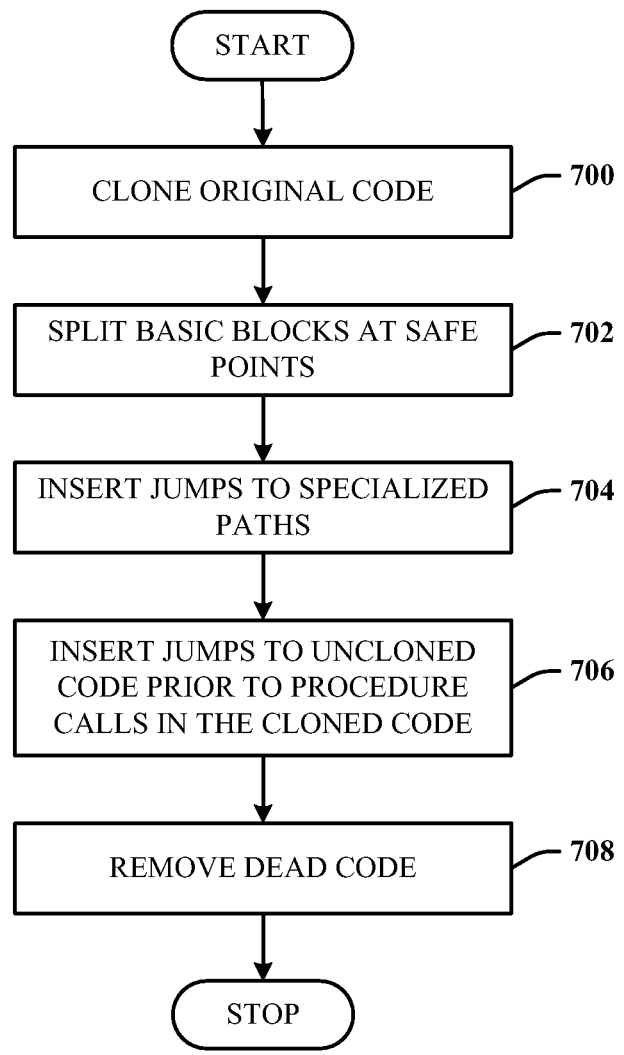
FIG. 7 illustrates a flow chart of an algorithm that a compiler can employ to generate the code versions for the specialized paths.

FIG. 7 illustrates a flow chart of an algorithm that a compiler can employ to generate the code versions for the specialized paths. It is assumed that the barrier at hand has well-defined barrier execution paths depending on the program phases and that a program phase change can only occur at well-defined potential safe points. It is further assumed that the designer (user of the path specialization technique) has partitioned the phases into n subsets and has distilled the specialized barrier for each of the sets. Finally, a test code is assumed that, given a phase number, indicates which code version should be used, that is, returns a number i, where $1 \leq i \leq n$.

The algorithm is specified for the intra-procedural path specialization. At 700, the original code is cloned. The entirety of the original code is cloned n times, marking the original code as uncloned and each clone with an index i, where $1 \leq i \leq n$. A mapping denoted Clone(i, j) is maintained which maps the pair (i, j) to the j-th instruction in the i-th clone. The original (or uncloned) code is the 0-th clone for this mapping.

At 702, basic blocks are split at safe points. This may be achieved by going over the code in each clone in any order. In each code clone, for each safe point appearing immediately after instruction j, the basic block is split just after instruction j and a jump is created after instruction j into the uncloned code at location Clone(0, j+1). The point before the jump in the cloned code is no longer regarded as a safe point. The point after the jump and before executing Clone(0,j+1) is regarded as a safe point. This can mean a runtime cooperation code or declaring that the code is safe for the collector to pause thread execution.

At 704, jumps to specialized paths are inserted. The original code is reviewed in any order to find memory accesses (requiring a barrier) in a basic block.

If instruction j is such a memory access (requiring barrier), the basic block is split immediately before instruction j. In all cloned code, jumps from the first part of the basic block to the second (keeping the original flow of execution) are inserted; however, in the uncloned code, a phase selection test and a parameterized jump to instruction Clone(i, j) are inserted just before instruction Clone(0, j), where i is the result of the selection test.

At 706, for intra-procedural optimization only, this can be achieved by going over the code in any order and ensuring all procedure calls are performed by the uncloned (safe) code, where the phase is checked again before a barrier. In other words, for each method call appearing on instruction j in any of the specialized clones, the basic block is split just before instruction j, and an unconditional jump into the uncloned code at Clone(0, j) is created after instruction j−1. This ensures that the return from a method execution will return to the unspecialized main code and a test for the appropriate specialized version will be executed before the next barrier.

At 708, dead code is removed. A control flow graph simplifier can be run to remove all cloned code prior to the first memory access after method entry or after a safe point (or after method entry). Uncloned code for which cloned code always runs (between a memory access and the following safe point) can also be eliminated.

Note that if every method call is treated as a safe point, then step 706 is not needed. Step 702 will ensure that control is transferred to the uncloned version prior to any method call. All method calls in the cloned versions are therefore unreachable and will be removed as dead code in step 708.

The above algorithm is presented for simplification. Various optimizations apply. For example, some of the optimization work can be done on the original code before cloning, thereby avoiding repeated work on the clones. Such optimizations are left for the implementor of the path specialization technique.

The inter-procedural optimizations described above can also be added. A modification of the safe point specification using a reachability analysis, and specialization of entire methods, instead of just code inside the method, can be incorporated into the above algorithm. Specialized entry and exit points can also be employed.

Figure 8:
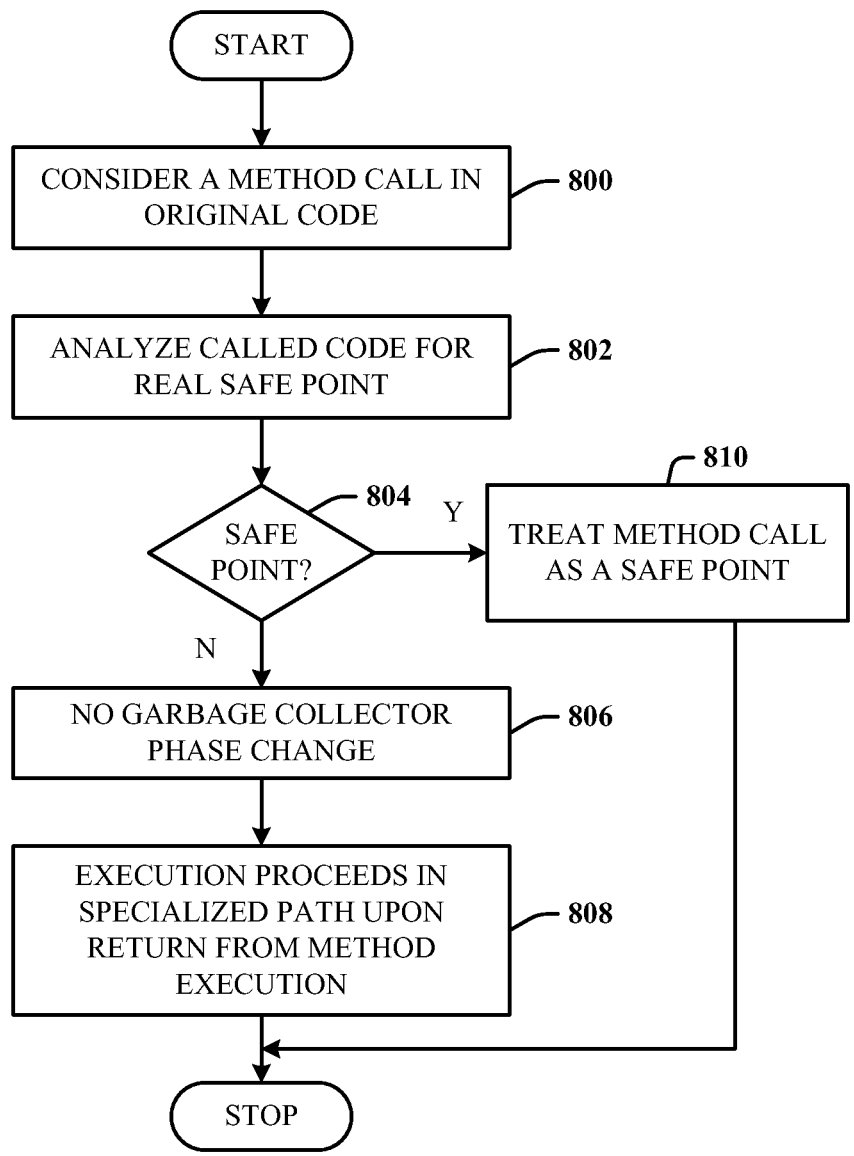
FIG. 8 illustrates a method of analyzing for code reachability in inter-procedural path specialization.

FIG. 8 illustrates a method of analyzing for code reachability in inter-procedural path specialization. At 800, a method call in the original code is received. At 802, the called code is analyzed to determine whether or not it contains a real safe point. At 804, if a real safe point does not exist in the called code, flow is to 806, where it can be assumed that no garbage collector phase change occurred during the execution of the called code. At 808, execution then proceeds in the specialized path upon return from the method execution. If a real safe point is found, flow is from 804 to 810 to treat the method call as a safe point.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
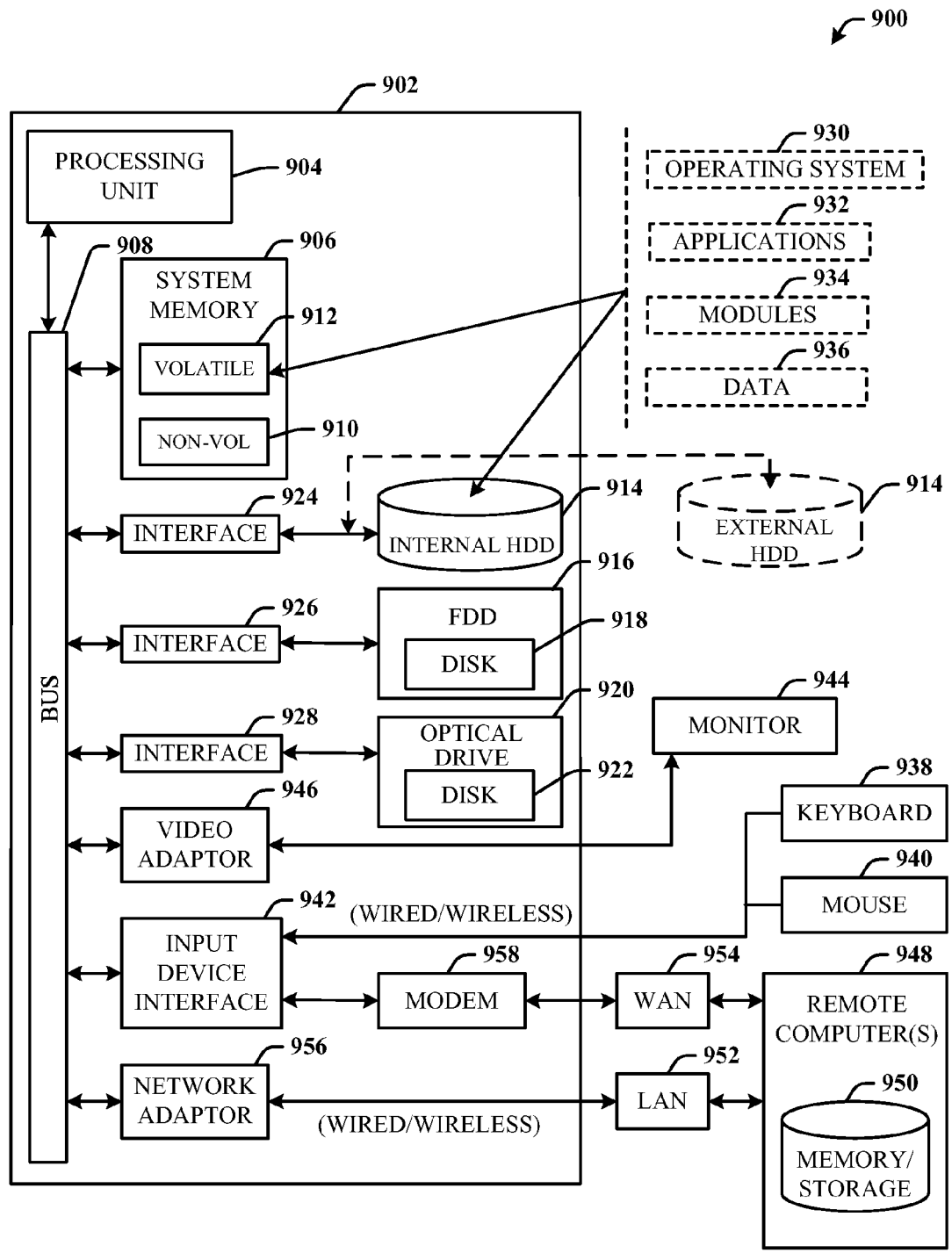
FIG. 9 illustrates a block diagram of a computing system operable to execute path specialization in accordance with the disclosed architecture.

Referring now to FIG. 9, there is illustrated a block diagram of a computing system 900 operable to execute path specialization in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS stores the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. The operating system 930, one or more application programs 932, other program modules 934, and program data 936 can include the cloning component 102, original program 104, specialized programs versions 106, execution component 108, execution phase(s) 110, phase component 202, selection component 208, original and specialized codes (302, 326, 328 and 330), original and specialized codes (402, 404 and 406) and the entities (502, 504, 506, 508, 510 and 512) of the system 500, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of optimizing an application, comprising acts of:
   duplicating general code into multiple code copies based on corresponding execution environment phases;
   configuring the copies by implementing code specialization to reduce the cost of specialized barrier operations dependent upon an execution environment phase in specialized code fragments for use in associated execution environment phases, the specialized code fragments are part of a specialized program that includes multiple different operation types for multiple different execution environment phases;
   detecting the execution environment phase and sending phase information to enable transfer control according to an observed phase;
   selecting and executing the specialized code fragments that are valid for a detected execution environment phase of a thread; and
   utilizing a microprocessor that executes instructions stored in a memory associated with at least the acts of duplicating, configuring, detecting, and selecting.

2. The method of claim 1, further comprising jumping from a specialized path back to the general code in recognition of program points where a thread recognizes a phase change.

3. The method of claim 1, further comprising jumping from one specialized path directly to another specialized path during barrier execution in recognition of program points where a thread recognizes a phase change.

4. The method of claim 1, further comprising analyzing called code for reachability of a real safe point.

5. The method of claim 1, further comprising splitting a basic block of code relative to a safe point in the general code.

6. The method of claim 1, wherein the specialized code fragment includes multiple different barrier types for multiple different garbage collector phases.

7. The method of claim 1, further comprising testing a predicate in the general code to determine an execution phase.

8. The method of claim 1, further comprising dynamically determining during execution of the general code which of the specialized paths to execute.

9. The method of claim 1, further comprising specializing a method into multiple specialized code fragments each having a designated entry point that is callable from the specialized code fragments.

10. A computer-implemented optimization system, comprising:
    a path specialization component configured to implement code specialization for creating multiple versions of specialized code fragments from an original code fragment for reducing cost of barrier operations dependent upon an execution environment phase, each specialized code fragment is valid only for execution in a specified subset of execution environment phases, the specialized code fragments are part of a specialized program that includes multiple different operation types for multiple different execution environment phases;
    a control component configured to transfer control at runtime between the specialized code fragments according to observed execution environment phase changes, so that a particular code fragment is valid for a particular execution environment phase;
    a phase component configured to detect the execution environment phase and send phase information to the control component to transfer control according to an observed phase; and
    a microprocessor configured to execute computer-executable instructions in a memory.

11. The system of claim 10, wherein the control component dynamically selects a specialized program fragment to execute.

12. The system of claim 10, further comprising a compiler that employs the specialization component to generate an executable program that employs the specialized code fragments.

13. The system of claim 10, wherein the execution environment includes a garbage collector which operates in multiple phases.

14. The system of claim 13, wherein collaboration between the original code fragment and the garbage collector requires the original code fragment to perform read-barrier or write-barrier operations.

15. The system of claim 13, wherein the specialization component replaces a general memory barrier with a specialized memory barrier.

16. The system of claim 10, wherein a specialized code fragment includes a conditional branch to a second specialized code fragment.

17. The system of claim 10, wherein the specialization component replaces a general operation in a specialized program version with a specialized operation.

18. A computer-readable physical storage memory comprising computer-executable instructions that when executed by a processor cause the processor to perform a method of optimizing an application, comprising acts of:
- duplicating general code into multiple code copies based on corresponding execution environment phases;
- configuring the copies by implementing code specialization to reduce the cost of specialized barrier operations dependent upon an execution environment phase in specialized code fragments for use in associated execution environment phases, the specialized code fragments are part of a specialized program that includes multiple different operation types for multiple different execution environment phases;
- detecting the execution environment phase and sending phase information to enable transfer control according to the detected environment phase; and
- selecting and executing the specialized code fragments that are valid for a detected execution environment phase of a thread.

19. The computer-readable physical storage memory of claim 18, further comprising jumping from a specialized path back to the general code in recognition of program points where a thread recognizes a phase change.

20. The computer-readable physical storage memory of claim 18, further comprising jumping from one specialized path directly to another specialized path during barrier execution in recognition of program points where a thread recognizes a phase change.

* * * * *